United States Patent [19]
Lauck

[11] 3,765,950
[45] Oct. 16, 1973

[54] METHOD OF PRODUCING A GEL CONTAINING CONCENTRATED SULFURIC ACID
[75] Inventor: Helmut Lauck, Schlobborn, Germany
[73] Assignee: Varta Aktiengesellschaft, Frankfurt am Main, Germany
[22] Filed: June 9, 1972
[21] Appl. No.: 261,162

Related U.S. Application Data
[63] Continuation-in-part of Ser. No. 16,931, March 5, 1970, abandoned.

[30] Foreign Application Priority Data
Mar. 10, 1969 Germany.................. P 19 11 976.7

[52] U.S. Cl................................. 136/158, 252/317
[51] Int. Cl. ............................................ H01m 9/04
[58] Field of Search............................ 136/157, 158; 252/317

[56] References Cited
UNITED STATES PATENTS
2,596,046  5/1952  Roth ................................. 252/317
2,684,950  7/1954  Rivers et al. ....................... 252/317
3,408,233  10/1968  Parker et al. ...................... 136/153
3,419,430  12/1968  Michaels............................ 136/157
3,556,851  1/1971  Douglas et al. .................... 136/157
3,586,539  6/1971  Lauck................................. 136/158

OTHER PUBLICATIONS

Roth et al., Defensive Publication T863,007, Published June 24, 1969.

Primary Examiner—Donald L. Walton
Attorney—Michael S. Striker

[57] ABSTRACT

Method of producing a gel containing concentrated sulfuric acid for use in lead accumulators having dry storagable charged electrode plates comprising polymerizing acrylic acid, methacrylic acid or amides thereof in solution with cross-linking agents, grinding the resultant gel, drying the ground gel and thereafter soaking the resin particles thereby obtained in concentrated sulfuric acid.

14 Claims, No Drawings

METHOD OF PRODUCING A GEL CONTAINING CONCENTRATED SULFURIC ACID

This application is a continuation-in-part of application Ser. No. 16,931, filed Mar. 5, 1970, now abandoned.

This invention relates to a process of preparing a gel containing concentrated sulfuric acid for use in lead accumulators having dry storagable charged electrode plates.

From the time when lead accumulators provided with dry charged storagable electrodes have been introduced into the art, various proposals have been advanced for overcoming the disadvantage associated therewith in that for setting the accumulator into operation, the same must be filled with sulfuric acid, this making it almost impossible to provide and market the accumulator together with the electrolyte. Proposals have been made whereby the accumulator is brought to the operable state, i.e., provided with the required sulfuric acid in the necessary concentrated form merely by filling the same with water.

For example, it has been proposed to erect on the lead accumulator a plastic container of similar shape which contains the needed dilute sulfuric acid and which is filled into the accumulator for activation. Such arrangement of the accumulator and electrolyte container have, however, the disadvantage that considerable space is required therefor.

It has also been proposed to provide the sulfuric acid in a concentrated and fixed form on the housing bottom so that the accumulator can be set into operation merely by the addition of water thereto.

According to a further proposal, the concentrated sulfuric acid is stored in a locked synthetic plastic container arranged over the cell block in the accumulator. The container is made of a synthetic resin not subject to attack by the sulfuric acid but which resin is soluble in organic solvents. Above this container there is arranged a further sealed container containing an organic solvent. The second container is made up of a water-soluble material. When water is introduced in the accumulator, the container containing the organic solvent is destroyed, the organic solvent thus freed dissolves the sulfuric acid container and the concentrated sulfuric acid is liberated and mixed with the water. Such an arrangement is quite complicated and not very reliable.

Heretofore, the known solid electrolytes have been prepared by utilizing pectin and the like in their manufacture and have proved unsuitable because of the resultant great space requirements. Concentrated sulfuric acid cannot be solidified by means of the known organic thickening agents as these are attacked by concentrated sulfuric acid and do not form any gels therewith. The known inorganic thickening agents are also not suitable as these must be used in essentially greater amounts, and further, they give rise to an increase in the temperature during the activation which produces results that are detrimental.

An object of the invention is a process for preparing a gel containing sulfuric acid that can be easily introduced into the accumulator and which will easily liberate its concentrated sulfuric acid content.

Another object of the invention is a solid sulfuric acid containing electrolyte suitable for use in a lead accumulator provided with dry storagable charged electrode plates.

Still another object of the invention is a solid sulfuric acid containing electrolyte suitable for use in a lead accumulator provided with dry storagable charged electrode plates which can be easily and economically produced.

A further object of the invention is a lead accumulator having dry storagable charged electrode plates and a solid sulfuric acid containing electrolyte which can be easily activated.

These and other objects and advantages are attained in accordance with the invention by providing a process for the manufacture of a gel containing concentrated sulfuric acid. The new process is characterized in that acrylic acid, methacrylic acid or their amides are polymerized in aqueous solution with a cross-linking agent, the thusly obtained gel ground up into particles and dried and concentrated sulfuric acid then poured over the dried gel particles.

An especially rapid and excellent swellable material is obtained when the polymerization is carried out in sulfuric acid and by grinding the recovered gel, washing the ground gel with water, and then drying the same. The particle size is of the resultant resin from 1 to 5 mm and preferably amounts to about 3 mm. The smaller particle size, the faster is the activation of the cell or battery.

As cross-linking agent methylene bis acrylamide has proved particularly suitable although other linking agents including acrylic-acid-allyl ester, methacrylic acid allyl ester, cyanic acid triallyl ester, ethylene glycol dimethacrylate can be used in the polymerization.

For the polymerization, solution polymerizations catalysts such as peroxides, perborates and persulfates, for instance ammonium persulfate, have proved particularly suitable.

In accordance with the invention 3–8 weight percent, preferably 4–5 weight percent of the organic material is present in the concentrated sulfuric acid, that is, in the sulfuric acid having a concentration of over 90 weight percent and preferably of 95–97 weight percent. This is achieved by pouring the concentrated sulfuric acid over the resin particles to produce a product composed of sulfuric acid having a concentration of at least 90 weight percent containing 3–8 weight percent, preferably 4–5 weight percent of the polymer.

Particularly favorably fine particles of sulfuric acid gel are obtained by drying the gel particles after the first grinding, thereafter subjecting the resin particles thereby obtained to a second grinding, and then treating the same with the concentrated sulfuric acid.

The mixture is allowed to swell by standing for about 72 hours and in this form is filled into the accumulator.

The mass of swelled material is preferably arranged on a porous synthetic foil disposed above the plate block and activated by the pouring on of water. In order to inhibit or prevent the admission of moisture, i.e., humidity, to the cell, during storage, the accumulator must be sealed airtight.

The following examples are given for the purpose of illustrating the invention and in no wise to be construed as limiting the scope thereof.

Example 1

5.0 g acrylic acid and 0.3 g methylene bis acrylamide were dissolved in 95 g water. Thereafter 0.05 g ammonium persulfate were introduced and the solution polymerized at a temperature of 80°C for about 10–20 minutes. The gel thus obtained was ground and the particles were washed with water to remove low molecular weight water soluble materials therefrom and the washed particles dried at 100°C. After the drying the resin particles were reground so that they had a maximum size of 3 mm. 96 percent sulfuric acid was poured over the synthetic particles so that the resin content in the sulfuric acid amounted to 4 wt. %. After 72 hours of swelling, the solidified acid was layered onto a porous polyethylene foil. After the gel had been filled into the battery, it was sealed airtight.

In order to activate the battery, pure water was poured into the cell and into the gel up to a previously indicated measuring mark.

Example 2

20.0 g methacrylic acid and 0.6 g methylene bis acrylamide were dissolved in 40 g water and after the addition of 0.08 g ammonium persulfate the mixture was allowed to polymerize at 50°C for about 15–30 minutes. The polymerization product was then further processed as set out in Example 1.

Example 3

5.0 g acrylic acidamide and 0.5 g methylene bis acrylamide were dissolved in 20 g water and following the addition of 0.05 g ammonium persulfate polymerized at about 60°C for about 20 minutes, and further worked up as set out in Example 1.

Example 4

5.0 g acrylic acid and 1.0 g methylene bis acrylamide were dissolved in 94 g of 80 percent sulfuric acid and the solution polymerized at 70°C for about 10–15 minutes. The gel thereby obtained was ground, washed several times with water, dried and reground until the particles did not exceed 3 mm in size. 96 percent sulfuric acid was then poured over the resin particles so that the content of the resin in the sulfuric acid amounted to 3 wt. %.

The essential advantage of the process of the invention lies in that sulfuric acid having a concentration of over 90 weight percent can be brought into solid form and particularly into the form of small particles of gel. The gel can be substantially freed of water soluble components which lessen the effects of the current. The ground and finished particles, i.e., concentrated sulfuric acid containing gel must be introduced into the battery under conditions excluding the presence of moisture. The resultant gel particles, however, having very small diameters, result in a very rapid activation of the accumulator when this is desired.

I claim:

1. Method of producing a gel containing concentrated sulfuric acid for use in lead accumulators having dry storagable charged electrode plates which comprises polymerizing a member selected from the group consisting of acrylic acid, methacrylic acid or their amides in solution in the presence of at least one unsaturated compound cross-linkable therewith, grinding the gel consisting of cross-linked polymer thereby obtained, drying the ground gel particles and thereafter pouring concentrated sulfuric acid over the resin particles thereby obtained.

2. Method according to claim 1, wherein said polymerization is carried out in aqueous solution.

3. Method according to claim 1, wherein said polymerization is carried out in a solution of sulfuric acid.

4. Method according to claim 1, wherein said polymerization is carried out with methylene bis acrylamide as cross-linking agent.

5. Method according to claim 1, wherein said resin particles are soaked with sulfuric acid having a concentration of at least 90 percent by weight so that the resin content in the sulfuric acid amounts to 3–8 weight percent.

6. Method according to claim 5 wherein said resin particles are soaked with sulfuric acid so that the resin content in the sulfuric acid amounts to 4–5 weight percent.

7. method according to claim 5, wherein said sulfuric acid has a concentration of from 95–97 percent.

8. Method according to claim 1, wherein said polymerization is carried out with a catalyst selected from the group consisting of peroxides and persulfates.

9. Method according to claim 1, wherein said polymerization is carried out with ammonium persulfate as catalyst.

10. Method according to claim 1, wherein said resin particles are ground at least one further time before said concentrated sulfuric acid is poured thereover.

11. Method according to claim 1, wherein said group member is acrylic acid.

12. Method according to claim 1, wherein said group member is methacrylic acid.

13. Method according to claim 1, wherein said group member is acrylic acid amide.

14. Method according to claim 1 wherein said polymerization is carried out with methylene bis-acrylamide as unsaturated cross-linkable compound.

* * * * *